June 15, 1926.
R. TOSSELL
1,588,508
BUMPER FOR MOTOR VEHICLES
Original Filed August 11, 1921
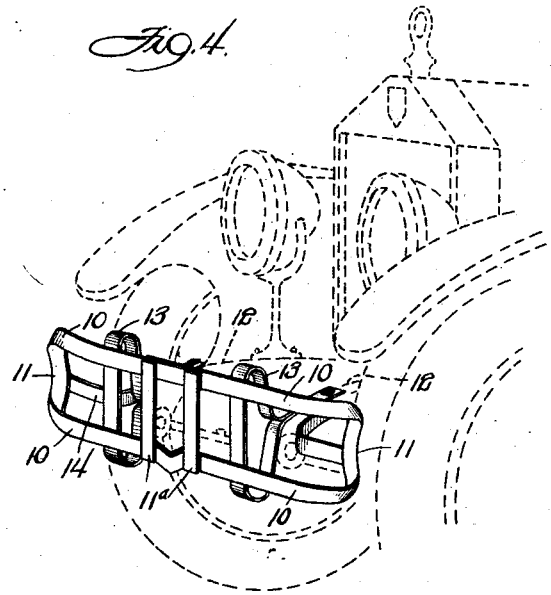
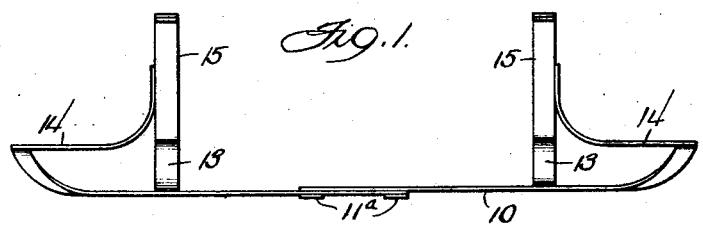
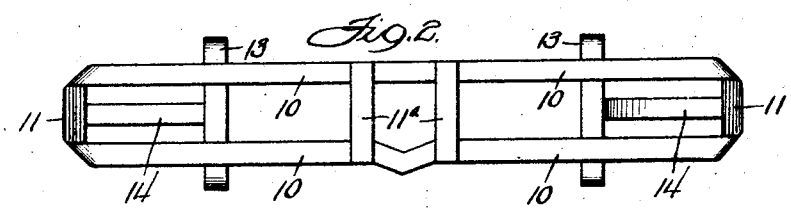
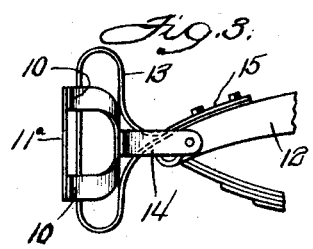
Inventor:
RICHARD TOSSELL Patented June 15, 1926.

1,588,508

UNITED STATES PATENT OFFICE.

RICHARD TOSSELL, OF CHICAGO, ILLINOIS.

BUMPER FOR MOTOR VEHICLES.

Original application filed August 11, 1921, Serial No. 491,411. Divided and this application filed March 19, 1925. Serial No. 16,632.

The invention of this application, which is a division of my application, Serial No. 491,411, filed August 11, 1921, relates to bumpers for automobiles and consists of improvements whereby efficiency of protection, cheapness of manufacture and enhancement of appearance are secured.

The bumper preferably is of the two-bar type, in which the bars are flat metal strips of suitable material and of sufficient size and strength for the purpose. The ends of the bumper are preferably formed by folding the horizontal or longitudinal members diagonally over and back, whereby graceful curves are imparted to the ends and corners of the bumper, and the horizontal bars are connected by a substantially vertical continuation thereof. This is readily accomplished by utilizing a single bar for each end of the bumper, which bar is folded and bent intermediate its ends to form one complete U-shaped end member of the bumper. Two such members are then assembled with their longitudinal portions overlapping or suitably secured together to form the complete bumper.

While the bumper is ornamental as a whole, I prefer to shape or form the intermediate portion of the bumper into a fanciful design, and I prefer also that this fanciful design be made to correspond with and thus to simulate the distinctive lines, name plates or insignias of the particular cars with which the bumpers are to be used, whereby the bumper harmonizes with the car as a whole in fitting and appearance.

Referring to the accompanying drawings:

Figure 1 is a plan view of a bumper embodying the invention;

Fig. 2 is a front elevation thereof;

Fig. 3 is an end elevation of the same;

Fig. 4 is a perspective view of the front end of an automobile equipped with a similar bumper.

Referring now to the figures, the bumper comprises the two vertically separated horizontal bars 10, preferably of flat steel, having their outer ends slightly curved to the proper or desired contour to give a slight rearward bend to the ends of the bumper and then folded or bent over to the rear on a diagonal corner curve to form the end pieces 11, which thus form vertical integral end connections between the upper and lower bars and gracefully curved ends for the bumper as a whole.

A bumper with its ends thus formed may be readily made by bending each end separately in a bar long enough to make half—more or less—of a complete bumper, and then securing the meeting ends of the upper bars and of the lower bars together. This may be done by welding or by overlapping the ends and riveting or bolting or by merely clamping the overrunning ends together. The bending may be readily accomplished over suitable forms when the bars are heated.

I preferably so shape or form these horizontal bars in their medial portion to simulate a fanciful design and preferably to correspond to and follow the distinctive lines of the front end of the particular cars, or the name plates or insignias thereof, with which they are to be used, and attach to said bars 10 other metal pieces, such for example, as the vertical strips 11$^a$, to complete the designs, lines, plates or insignias, whereby an ornamental and distinctive appearance is imparted to the bumper and car. The strips 11$^a$, or any others which may be so applied, serve also to brace and strengthen the bars and consequently afford better protection.

These bumper bars are prefrably supported from the projecting ends of the channel side bars 12 of the car, by vertical spring loops 13 which are bolted or otherwise secured to the bars 12. These loops are preferably formed of flat spring bars secured intermediate of their ends by bolts or rivets or as desired, to the bars 10 as indicated in the drawings.

The extreme ends of the bumper also are preferably supported from the side frames 12 of the car by curved braces 14, of flat steel bars, bolted, riveted or clamped flatwise at an intermediate point of the ends 11 of the bumper, and to the side frames 12 of the car chassis as indicated by the drawings.

While I have thus particularly described one form of my invention, it will be understood that various changes and alterations therefrom may be made without departing from the scope and principle of the same as set forth or intended to be set forth in the appended claims.

What I claim as new, and desire to secure by Letters Patent of the United States, is:

1. A bumper for vehicles comprising a pair of U-shaped impact units extending in opposite directions and having the arms of each overrunning those of the other, means for securing the units against separation from one another, and means for attaching the combined units to a vehicle, including a spring bar connected intermediate of its ends to the combined units and at its ends to the vehicle whereby the impact units will be supported transversely of the vehicle.

2. A bumper for vehicles comprising a pair of U-shaped impact units extending in opposite directions and having the arms of each overrunning those of the other, means for securing the units against separation from one another and a pair of spring bars each connected at an intermediate point to the base portion of one of the units, extending along the unit for a distance, and then curved transversely of the unit for connection to a side bar of the vehicle frame.

In witness whereof, I have hereunto subscribed my name.

RICHARD TOSSELL.